July 3, 1934. S. GINSBERG 1,965,073
PROCESS OF MANUFACTURING AND RECLAIMING TIRES
Filed Sept. 27, 1933 2 Sheets-Sheet 2
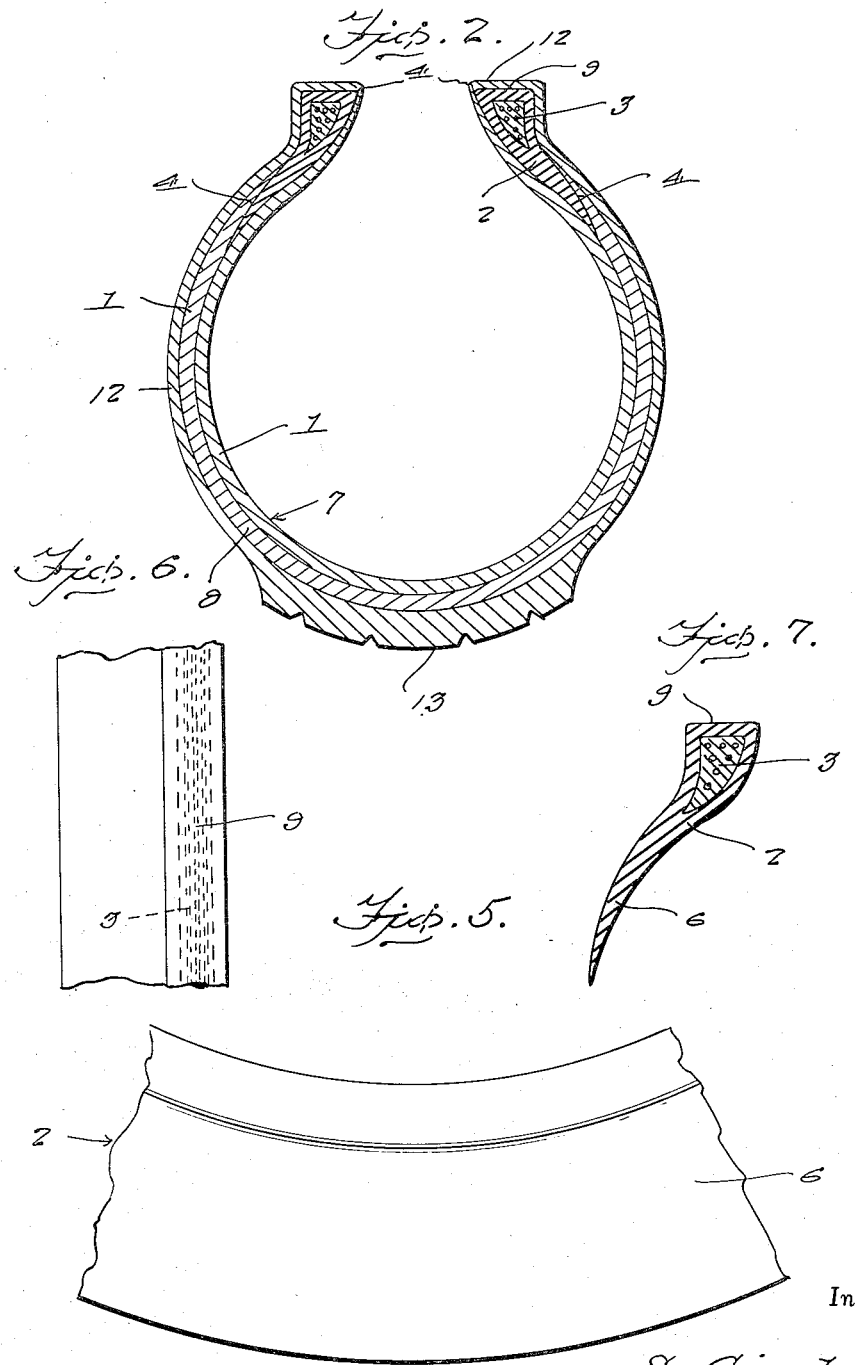
Inventor
S. Ginsberg
By Clarence A. O'Brien
Attorney Patented July 3, 1934

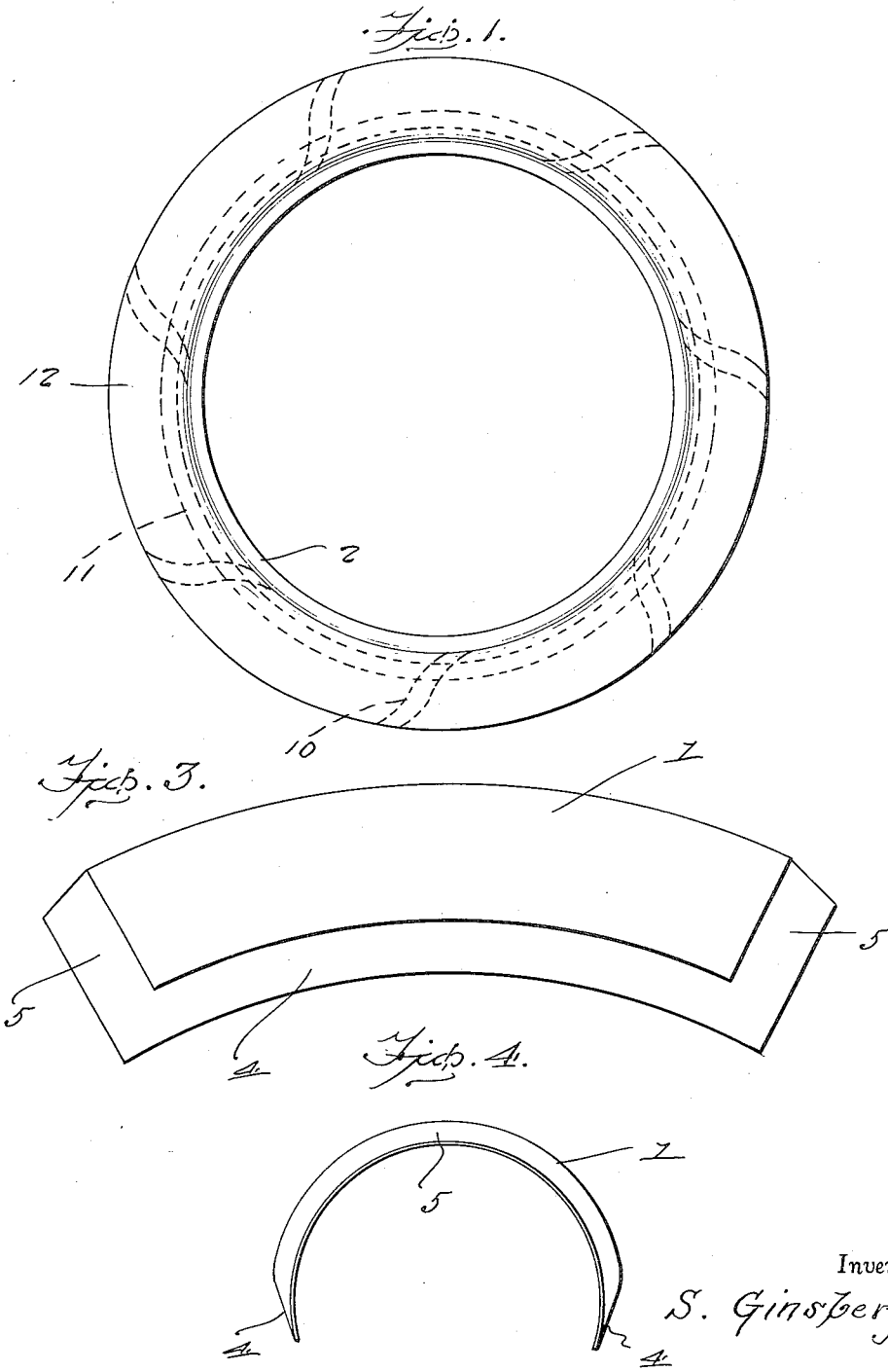

1,965,073

UNITED STATES PATENT OFFICE 1,965,073

PROCESS OF MANUFACTURING AND RECLAIMING TIRES

Solomon Ginsberg, Nashville, Tenn.

Application September 27, 1933, Serial No. 691,206

3 Claims. (Cl. 154—14)

This invention relates to improvements in manufacturing and reclaiming automobile wheel tires and particularly the casing of pneumatic tires.

Briefly the invention resides in the manufacture of tires or the reclaiming of old tires from salvage parts of such worn and old tires unfit for further use.

The invention also consists in the method of reducing or increasing the rim diameter of old tires and in the use of salvaged parts of old tires in the carrying out of this process.

The invention together with its objects and advantages will be best understood from a study of the following description taken in connection with the accompanying drawings wherein is illustrated one method of carrying out the invention, and in which:

Figure 1 is a side elevational view of a complete pneumatic tire casing constructed in accordance with the present invention.

Figure 2 is a transverse sectional view therethrough.

Figure 3 is a side elevational view of a salvaged portion of an old tire.

Figure 4 is an end elevational view of the part shown in Figure 3.

Figure 5 is a fragmentary side elevational view, on an enlarged scale of a salvaged bead portion of an old tire casing.

Figure 6 is a top plan view thereof.

Figure 7 is a transverse sectional view therethrough.

In carrying out the invention or process the steps taken are as follows: First from old or used automobile tires are salvaged pieces 1 of the body of such a tire that contains no imperfection. Also from old or used automobile tires are salvaged the bead portion 2 that are also free of imperfections and are provided with the usual metal reinforcements 3. From such salvaged parts 1 and 2 the carcass of the tire is formed as will be presently understood.

When the desired parts above mentioned have been procured, each one has its marginal edge portions scarfed down to provide feathered side edges 4 and end edges 5. Each tire bead 2 has the fabric thereof worked down to the desired condition so as to provide a continuous tapered or feathered body portion 6.

After having prepared the pieces 1 and 2 the following method of assembling these salvaged parts in the completion of the tire casing is resorted to.

First I take a desired number of the pieces 1 and secure such pieces in a longitudinal direction while overlapping the scarfed ends 5 and cementing said ends together in such a manner as to form the smooth joints thus forming for the tire carcass an inner ply 7. An outer ply 8 is similarly formed from other pieces 1, and the joints formed between the adjacent ends of the pieces 1 constituting the outer ply 8 overlie the joints formed by those pieces 1 which make up the inner ply 7, and these joints are indicated by the reference numeral 10.

As shown in Figure 2 the pieces 1 forming the inner ply 7 have their side or longitudinal edges 4 extended beyond the corresponding sides or longitudinal edges of those pieces 1 making up the outer ply 8 so that the edges 4 of the pieces making up the inner ply 7 terminate substantially flush with the peripheral faces 9 of the bead 2. The beads 2 have their body portions 6 inserted between the grooves formed between the edges 4 of the pieces 1, and the pieces 1 of the plies 7 and 8 are cemented to the bodies 6 of the beads 2, and the joints between the pieces 1 and 2 are indicated by the reference numerals 11.

The carcass of the tire casing being now complete I place over the entire external surface thereof a rubber coating 12, which coating, it is to be noted extends over the peripheral faces 9 of the beads 2 to the edges of the pieces 1 forming the inner ply 7 (see Figure 2). The coating 12 is adhesively secured to the carcass through the medium of a rubber cushion or cement which is first applied to the carcass after which the coating 12 is applied.

After the placing of the coating 12 on the carcass the tire is provided with a suitable tread 13 formed in the coating 12. The tire is then placed in the proper mold and vulcanized in the usual manner.

From the above it will be seen that I can thus produce a tire from reclaimed portions of old tires at a cost much less than is possible in the present method of manufacturing pneumatic tire casings.

Sometimes it is desirable to change the diameter of an old tire whose carcass is perfect but which desires a new tread. Under such circumstances I proceed as follows:

I first procure or salvage the bead section 2 from an old tire of the desired size and prepare it as hereinbefore described. I next take the tire which is to be improved and after stripping therefrom the old tread I remove the bead section from it. After so removing the bead section I separate the layers of fabric at the circumferential edges of the side walls of the casing and remove from the walls a wedge shaped section so as to provide in each wall a continuous substantially V-shaped groove for accommodating the body part 6 of the salvaged bead 2. Into such groove is inserted the body part 6 of the salvaged bead and when so inserted the body of the bead is covered or saturated with rubber cement for adhesively securing the bead in place. The entire carcass is then coated with a suitable rubber cement through the medium of which is adhesively secured to the exterior of the carcass a coating of rubber such as the coating 12 hereinbefore referred to. The tire is then retreaded and the same then placed in the mold and vulcanized as a final step in the reclamation of the tire.

As will be understood where it is desired merely to supply the tire with a new bead or beads, the carcass of the tire being otherwise serviceable and not requiring a new tread, a salvaged bead or beads is applied to the carcass of the tire in a manner identical with that described above. However in the latter case there being no need of a new tread the application of a coating, such as the coating 12 is dispensed with, and in eliminating this step, after the bead or beads 2 have been applied to the carcass of the reclaimed tire the said tire is placed in the mold and vulcanized.

As an alternate to the above, a new or salvaged bead may be applied to an old tire by removing the damaged bead from the tire being repaired, then scarfing down the outer face of the walls of the tire to a thin tapered edge. Next the bead to be applied is also scarfed down and then united in any suitable manner with the scarfed edges of the walls of the tire in a manner to form a smooth lap-joint with the scarfed or beveled surface of the walls of the tire casing in contact with the scarfed or beveled surfaces of the bead section, their outer surfaces making one continuous surface on each side of the joint formed therebetween.

Having thus described my invention, what I claim as new is:

1. The herein described process of manufacturing pneumatic tire casings which consists in first reclaiming from old or used tires pieces of the carcass thereof; secondly feathering the marginal edge portions of such reclaimed pieces; thirdly, forming a two ply body from said reclaimed pieces by dividing the pieces into two series; and uniting the pieces of each series in a longitudinal direction and by overlapping their scarfed end edges and cementing said overlapping end edges together; fourth, placing one series of united pieces over the other with the side edges of the pieces mutually separated; fifthly reclaiming undamaged beads of old tires and trimming each bead to provide a tapered body portion; sixth sandwiching the body portions of the beads between the separated side edges of the aforementioned pieces and uniting said body portion of the bead with said edges of said pieces; seventh applying a rubber coating to the exterior of the carcass thus formed; eighth applying a tread to the tire, and finally vulcanizing the tire in the usual manner.

2. The herein described process of making pneumatic tire casings which consists in reclaiming a tire casing, removing the damaged bead therefrom, and processing the walls of the tire casing by scarfing one face thereof to a beveled surface, and then applying to the casing salvaged beads one side of which has been similarly processed to present a beveled surface to fit the bevel of the processed walls of the tire casing, next pressing the beveled surfaces of the tire bead to the beveled surfaces of the walls of the tire casing and adhesively uniting said surfaces so as to form a smooth lapped joint with the outer surface lying in one continuous plane.

3. The herein described process of making pneumatic tire casings which consists in reclaiming a tire casing, removing the damaged bead therefrom, and processing the walls of the tire casing by scarfing one face thereof to a beveled surface, and then applying to the casing salvaged beads one side of which has been similarly processed to present beveled surfaces to fit the bevels of the processed walls of the tire casing, next pressing the beveled surfaces of the tire bead to the beveled surfaces of the walls of the tire casing and adhesively uniting said surfaces so as to form a smooth lapped joint with the outer surface lying in one continuous plane, and finally saturating the whole with rubber cushion or rubber cement and then retreading the tire.

SOLOMON GINSBERG.